United States Patent
Baughman et al.

(10) Patent No.: US 12,554,939 B2
(45) Date of Patent: Feb. 17, 2026

(54) FORECASTED DIVERSE NATURAL LANGUAGE GENERATION MODELS

(71) Applicant: INTERNATIONAL BUSINESS MACHINES CORPORATION, Armonk, NY (US)

(72) Inventors: Aaron K. Baughman, Cary, NC (US); Chandankumar Johakhim Patel, Fairborn, OH (US); Mauro Marzorati, Lutz, FL (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 18/339,252

(22) Filed: Jun. 22, 2023

(65) Prior Publication Data

US 2024/0428012 A1    Dec. 26, 2024

(51) Int. Cl.
*G06F 40/40* (2020.01)
*G06F 40/247* (2020.01)

(52) U.S. Cl.
CPC ............ *G06F 40/40* (2020.01); *G06F 40/247* (2020.01)

(58) Field of Classification Search
CPC .............................. G06F 40/40; G06F 40/247
See application file for complete search history.

(56) References Cited

U.S. PATENT DOCUMENTS

| | | |
|---|---|---|
| 7,249,117 B2 | 7/2007 | Estes |
| 11,122,341 B1 | 9/2021 | Decrop |
| 11,392,847 B1 * | 7/2022 | Abdollahian .......... G06N 20/00 |
| 2017/0235723 A1 | 8/2017 | Allen |
| 2022/0309245 A1 | 9/2022 | Baughman |
| 2023/0154188 A1 * | 5/2023 | Li ........................ G06V 10/776 382/159 |
| 2024/0020337 A1 * | 1/2024 | Maharana ........... G06F 16/7844 |
| 2024/0037335 A1 * | 2/2024 | Akbari .................. G06F 40/216 |

FOREIGN PATENT DOCUMENTS

| | | |
|---|---|---|
| CN | 106405352 A | 2/2017 |
| CN | 107578101 B | 1/2018 |

OTHER PUBLICATIONS

Kantharaj et al., Chart-to-text: A large-scale benchmark for chart summarization, arXiv:2203.06486, 2022 (Year: 2022).*
Alayrac et al., Flamingo: a visual language model for few-shot learning, Advances in Neural Information Processing Systems, 35, 2022 (Year: 2022).*

(Continued)

*Primary Examiner* — Bhavesh M Mehta
*Assistant Examiner* — Eunice Lee
(74) *Attorney, Agent, or Firm* — Kristofer Haggerty

(57) ABSTRACT

A method, a structure, and a computer system for diverse natural language generation. The exemplary embodiments may include training a data-to-text neural network (D2T NN) and training a text-to-text neural network (T2T NN), wherein the D2T NN and the T2T NN have identical transformer architectures, and wherein the training of the D2T NN and the T2T NN are indexed by time. The exemplary embodiments may further include interleaving weights between the D2T NN and the T2T NN, as well as generating a sentence based on the interleaved D2T NN and T2T NN.

17 Claims, 5 Drawing Sheets

(56) References Cited

OTHER PUBLICATIONS

Gelfand, Gibbs sampling, Journal of the American statistical Association, vol. 95 No. 452, 2000 (Year: 2000).*
Maekaku et al., Attention Weight Smoothing Using Prior Distributions for Transformer-Based End-to-End ASR, Interspeech, 2022 (Year: 2022).*
Shan et al., ERNIE-ViL 2.0: Multi-view Contrastive Learning for Image-Text Pre-training, arXiv:2209.15270, 2022 (Year: 2022).*
Xia et al., Tied transformers: Neural machine translation with shared encoder and decoder, Proceedings of the AAAI conference on artificial intelligence, vol. 33, No. 01, 2019 (Year: 2019).*
Kale et al., Text-to-Text Pre-Training for Data-to-Text Tasks, arXiv:2005.10433, 2021 (Year: 2021).*
Disclosed Anonymously, "Method and System for Providing Context-based, Customizable Virtual Commentator for Electronic Tournaments," IP.com No. IPCOM000254001D, IP.com Publication Date: May 23, 2018, 3 pages.
Dong et al., "A Survey of Natural Language Generation", ACM Computing Surveys, vol. 55, No. 8, Article 173. Publication date: Dec. 23, 2022., https://dl.acm.org/doi/10.1145/3554727, 38 pages.
Kim et al., "Automatic Baseball Commentary Generation Using Deep Learning," The 35th ACM/SIGAPP Symposium on Applied Computing (SAC '20), Mar. 30-Apr. 3, 2020, ACM, pp. 1056-1065.
Kmet et al., "A 24h forecast of solar irradiance using echo state neural networks", 16th EANN workshops, Sep. 25-28, 2015, ACM, https://dl.acm.org/doi/10.1145/2797143.2797166, 5 pages.
Monzon et al., "Incremental Local Model Networks for Time Series Prediction," IJCNN'01. International Joint Conference on Neural Networks. Proceedings (Cat. No. 01CH37222), IEEE, Jul. 15-19, 2001, https://ieeexplore.ieee.org/document/938409, 5 pages.
Murphy, "The Shot Heard Round The World", YouTube, Accessed: Apr. 12, 2023, https://www.youtube.com/watch?v=lrl7dVj90zs&t=19s, 9 pages.
Strauss et al., "Eric: A Generic Rule-based Framework for an Affective Embodied Commentary Agent," Proc. of 7th Int. Conf. on Autonomous Agents and Multiagent Systems (AA-MAS 2008), May, 12-16, 2008, 8 pages.
Suglia et al., "Going for Goal: A Resource for Grounded Football Commentaries," arXiv:2211.04534v1 [cs.CV] Nov. 8, 2022, https://arxiv.org/pdf/2211.04534.pdf, 16 pages.
Unterthiner et al., "Predicting Neural Network Accuracy from Weights," arXiv:2002.11448v4 [stat.ML] Apr. 9, 2021, https://arxiv.org/pdf/2002.11448.pdf, 18 pages.
Wikipedia, "Mick Hubert", Wikipedia—The Free Encyclopedia, Accessed Apr. 12, 2023, https://en.wikipedia.org/wiki/Mick_Hubert, 3 pages.
Wu et al., Connecting the Dots: Multivariate Time Series Forecasting with Graph Neural Networks, KDD '20: Proceedings of the 26th ACM SIGKDD International Conference on Knowledge Discovery & Data Mining, Aug. 2020, ACM, https://dl.acm.org/doi/10.1145/3394486.3403118, 11 pages.
Xie et al., Integrating Image-Based and Knowledge-Based Representation Learning:, IEEE Transactions on Cognitive and Developmental Systems, vol. 12, Issue: 2, Jun. 2020, https://ieeexplore.ieee.org/document/8689107, pp. 169-178.
Yao et al., "Internet Traffic Forecasting using Temporal-Topological Graph Convolutional Networks," 2021 International Joint Conference on Neural Networks (IJCNN), IEEE, Jul. 18-22, 2021, https://ieeexplore.ieee.org/document/9534096, 8 pages.

* cited by examiner

400

FORECASTED DIVERSE NATURAL LANGUAGE GENERATION MODELS

BACKGROUND

The exemplary embodiments relate generally to natural language generation, and more particularly to diverse natural language generation.

Traditional generated artificial intelligence commentary follows a two-step process that turns statistics into a sentence (data-to-text, D2T) and paraphrases the sentence for variety (text-to-text, T2T). However, within live events such as a sporting event, the game play of a sport rapidly evolves. New and unseen circumstances such heroes or statistics emerge while new records and standards are established. As this happens, machine learning algorithms attempt to predict future winners and losers while reflecting on the past. Moreover, fans expect to be able to play what if scenarios within the context of future predictions or historical results that have been published. However, when natural language generation is applied to time sensitive data, the sentences become disjointed with emerging statistics, strategies, and game context.

SUMMARY

The exemplary embodiments disclose a method, a structure, and a computer system for diverse natural language generation. The exemplary embodiments may include training a data-to-text neural network (D2T NN) and training a text-to-text neural network (T2T NN), wherein the D2T NN and the T2T NN have identical transformer architectures, and wherein the training of the D2T NN and the T2T NN are indexed by time. The exemplary embodiments may further include interleaving weights between the D2T NN and the T2T NN, as well as generating a sentence based on the interleaved D2T NN and T2T NN.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Figure 1:
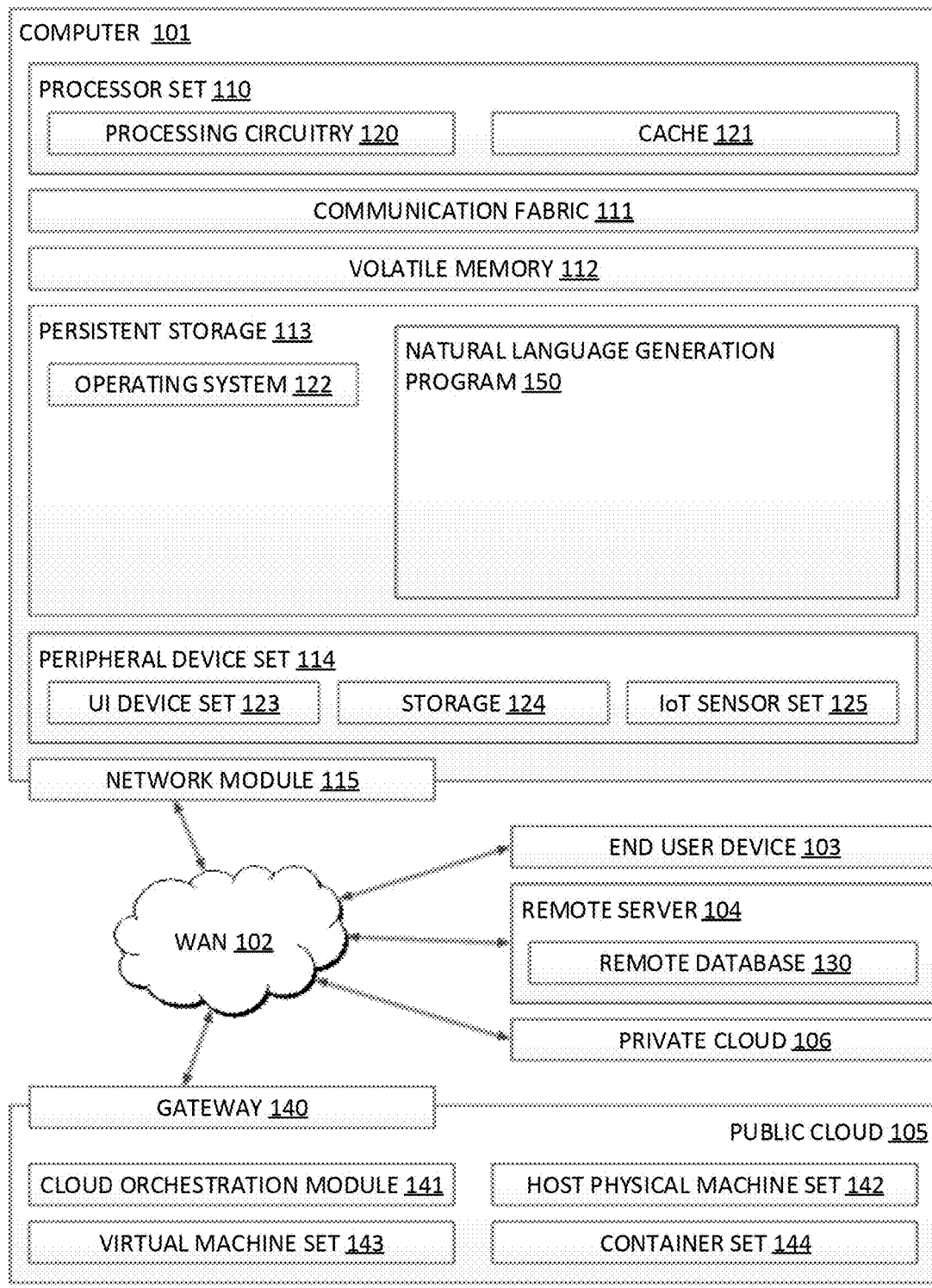
FIG. 1 depicts an exemplary block diagram depicting the components of computing environment 100, in accordance with the exemplary embodiments.

FIG. 1 depicts an exemplary block diagram depicting the components of computing environment 100, in accordance with the exemplary embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as natural language generation program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication Fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open-source Portable Operating System Interface-type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user, and may take any of the forms discussed above with respect to computer 101. The EUD 103 may further include any components described with respect to computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As noted above, traditional generated artificial intelligence commentary follows a two-step process that turns statistics into a sentence (data-to-text, D2T) and paraphrases the sentence for variety (text-to-text, T2T). However, within live events such as a sporting event, the game play of a sport rapidly evolves. New and unseen circumstances such heroes or statistics emerge while new records and standards are established. As this happens, machine learning algorithms attempt to predict future winners and losers while reflecting on the past. Moreover, fans expect to be able to play what if scenarios within the context of future predictions or historical results that have been published. However, when natural language generation is applied to time sensitive data, the sentences become disjointed with emerging statistics, strategies, and game context.

Typically, to train a D2T, a set of tuples need to be created and extracted from data, such as statistical game play. The tuples are used to train a model that can transform the tuples into a base sentence. Next, a set of sentences are created for each base sentence such that we have paraphrased representations of the statistics. This process, however, suffers from the drawback that the training data is very specific for each machine learning phase.

The present invention addresses the drawback noted above in the current state of the art of natural language generation, and as such improves upon the field of natural language generation. More specifically, in order for the T2T to add more accurate contextual information from the D2T, the D2T model and the T2T model phases need to be correlated together without any training so that data time slices can be paraphrased with different game language. The D2T model topological weights can be forecasted to align to a simulated game state where emergent tuples will be represented. The topological weights can then be transferred in part to a T2T model to mix time periods together. By mixing the time periods, the present invention avoids the generation of disjointed sentences noted above when natural language generation is applied to time sensitive data.

Moreover, using the present invention, unseen circumstances within live game play can be modelled by D2T models and transferred to T2T models for any time-period. The generated text will match a user's mental model based on the context of where they are viewing the what if scenarios.

The present invention leverages the importance of both network topology and weights for the direct introspection of accuracy. This leads us to use trends of neural network weights over time to forecast future weights for differing time slices.

Improvements the present invention provides to the field of natural language generation includes the use of Data-2-Text and Text-2-Text correlated forecasts with identical topologies, an emergent natural language generation model from stats to text and paraphrasing models, style transfer from identical topological models, time based slices of natural language generation (NLG) model phase matching, batch based forecast learning to accelerate the integration of multiple weights from different neural networks, and smoothing weights between interleaved layers of D2T and T2T layers with unsupervised techniques (i.e. Gibs sampling).

Figure 2:
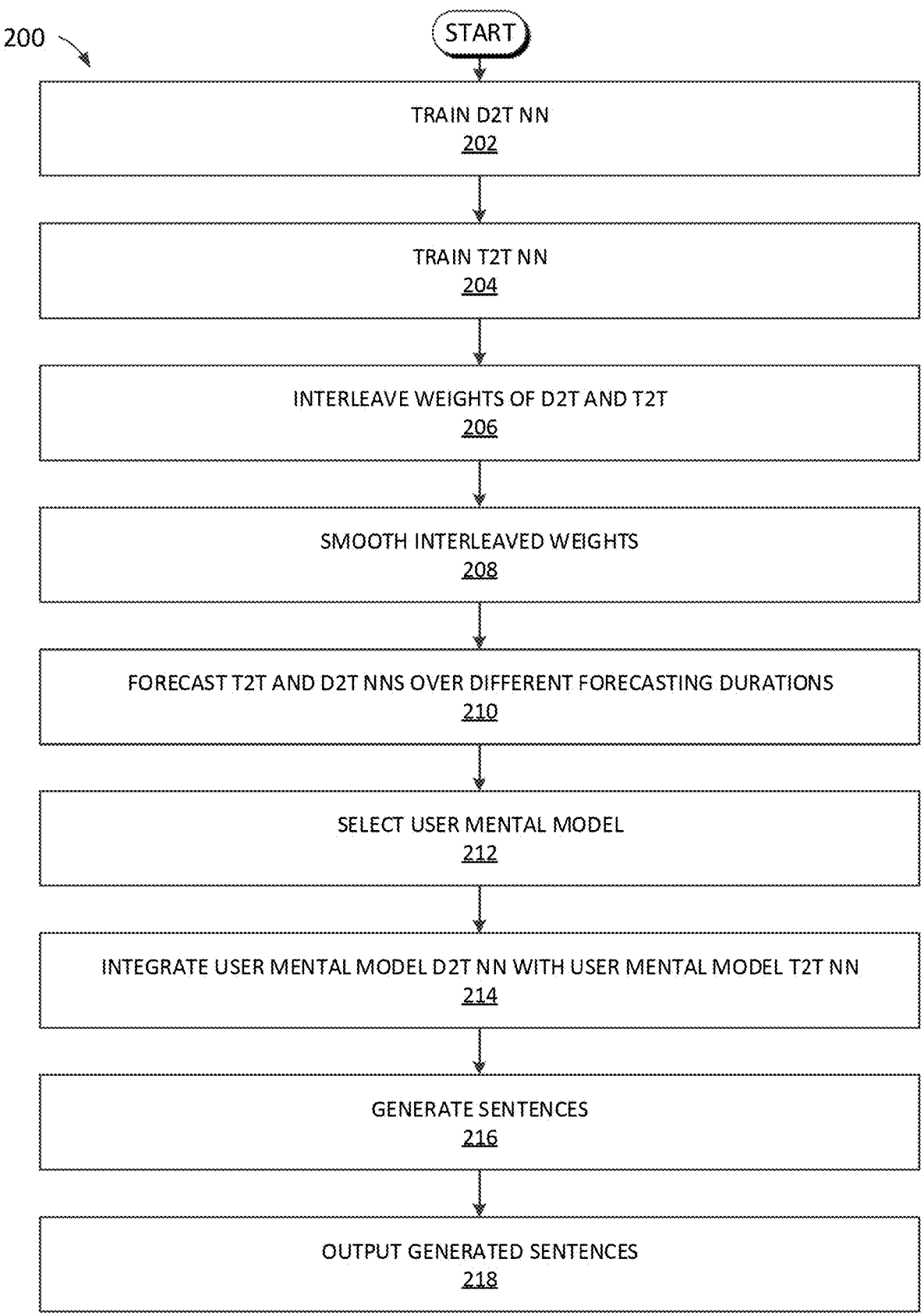
FIG. 2 depicts an exemplary flowchart 200 illustrating the operations of natural language generation program 150 of computing environment 100, in accordance with the exemplary embodiments.

For a more detailed description of the present invention, reference is now made to FIG. 2 depicting an exemplary flowchart 200 illustrating the operations of natural language generation program 150 of computing environment 100, in accordance with the exemplary embodiments.

Natural language generation program 150 may train (or retrieve) a data-to-text (D2T) neural network (NN) (step 202). In embodiments, the D2T NN may be a transformer configured to convert data into tuples and the tuples into basic/generic sentences. The basic/generic sentences may be narrative and lack style such as personality, variety, and context. The data from which the tuples are generated may be any structured data, for example statistics, that are stored in formats such as tabular, graph nodes, JSON, etc. For example, natural language generator 150 may generate a JSON tuple from features extracted from an ontology using a feature extractor. In the proceeding detailed description, natural language generation program 150 utilizes Resource Description Framework (RDF) triplets (e.g., OWL), however it will be appreciated that the D2T NN may be trained with any structured data. These data triplets can be generated from, e.g., a triplet store that links subjects, predicates, and objects in a format such as <subject> <predicate> <object> (see, for example, FIG. 3A). Natural language generation program 150 may train each component of the D2T NN using forecasted weights over time sliced training with accumulated training data. The batches of learning are indexed such that the resulting weights of the models are indexed over time. A multi-head attention and feed forward neural network within an input embedding are forecasted forward independently. The decoding components of several multi-head attention and several feed forward neural networks are forecasted forward. Each batch training results are saved for the individual component of the neural network and all component-based weights are indexed by time. Now, the component-based weights can be forecasted forward.

Figure 4:
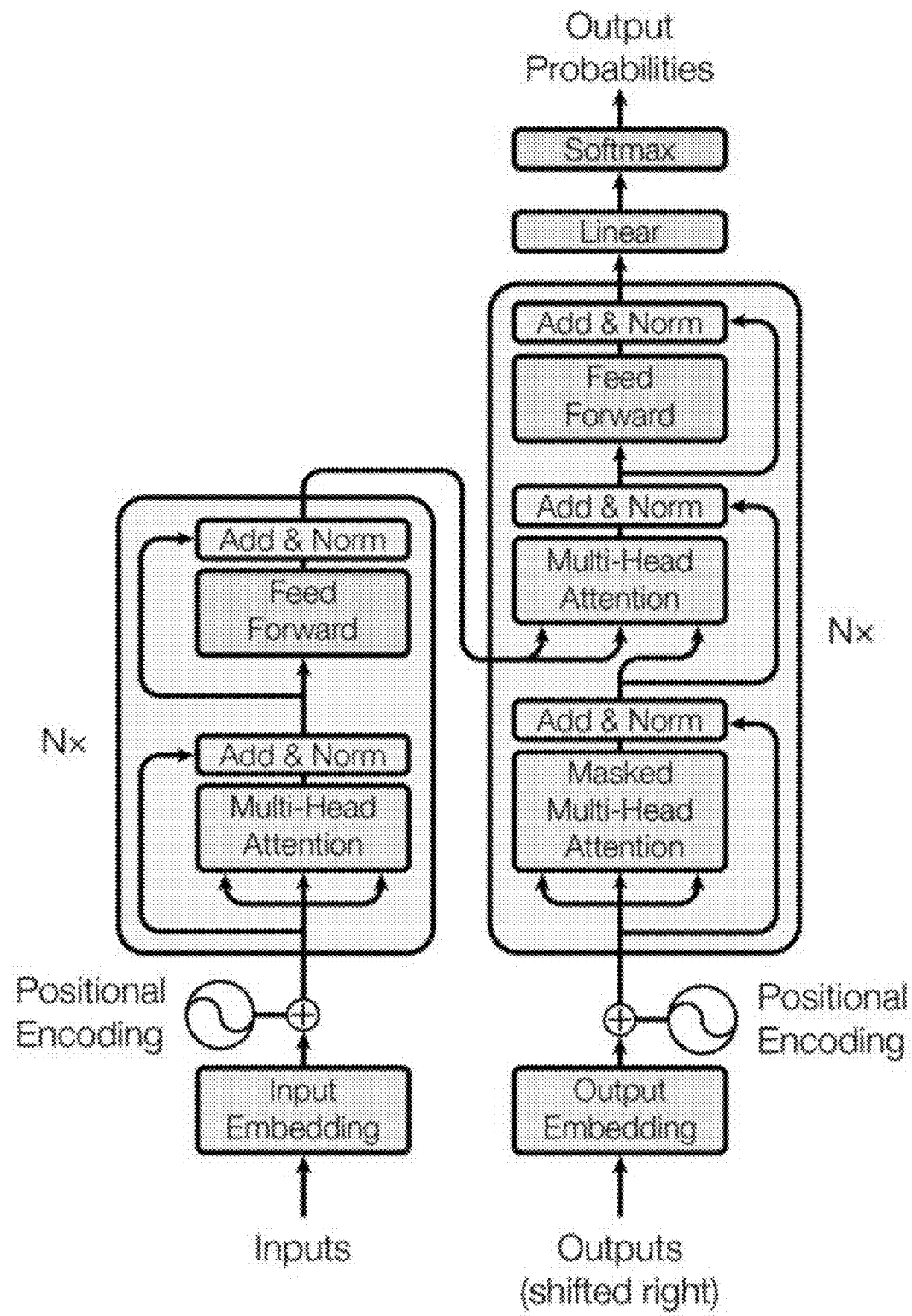
FIG. 4 depicts an exemplary transformer, in accordance with the exemplary embodiments.

For example, FIG. 4 depicts an exemplary architecture of a D2T NN (and T2T NN) transformer. The transformer may include an input embedding layer and a positional encoding layer. The input embedding layer may encode a meaning of the input sequence while the positional encoding may represent a position of the word within the input sequence. The transformer may then combine the embedding with the positional encoding for input into an encoder stack. The encoder stack may produce an encoded representation of the input sequence and includes a multi-head attention layer and a feed-forward layer. Attention mechanisms allow for the transformer to devote more focus to important parts within and relations between the data, while multi-head attention allows for the transformer to run through the attention mechanism multiple times in parallel. The feedforward layer may additionally weight and process the output for input into a next component. A decoder stack may produce an output sequence based on the encoded representation and include two multi-head attention layers, one of which masked, and a feedforward layer. An output of the decoder may then be passed to a linear layer that maps the input data to the output data and a softmax layer that allows for output of multi-class probabilities. It should be noted that the transformer depicted by FIG. 4 is only exemplary and embodiments of the present invention may modify the transformers as needed and based on application.

The D2T NN may, for example, be trained to generate tennis statistic tuples from a triplet store depicted by FIG.

3A, then tennis statistic base sentences from the tuples. The D2T NN may generate the sentence "Player A serves at 105 mph" based on the triplet <Player: Player A> <action: Service> <Speed: 105 mph>. In this example, the data used in training the D2T NN may be from a time period when the tennis player A is playing excellent, and therefore the tuples and generated base sentences may connote excellent statistics. As such, the tuples and base sentences trained during a period of excellent play by player A may not be suitable for periods when player A is not playing excellent.

Natural language generation program 150 may train (or retrieve) a text-to-text (T2T) neural network (NN) (step 204). In embodiments, the T2T NN may be a transformer that, given a text input, generates alternative text that maintains a semantic meaning of the input text. A T2T NN may, for example, translate an input sentence into another language. Here, natural language generation program 150 may build a T2T NN that produces paraphrases of the input sentence. Moreover, the built T2T NN may paraphrase the text dynamically in that relevant contextual references are used in generating the paraphrase. Thus, the T2T NN may add context while paraphrasing the input text based on a current, past, or future who, what, why, where, when, and how, all while keeping intact the meaning conveyed in the input text. Natural language generation program 150 may train the T2T NN in a similar yet independent manner as that of the D2T NN described above. Here, the training data may be contextual versions of a generic sentence such that the T2T NN learns how context may be added to a base sentence. In embodiments, the T2T NN may have a same topology and architecture as the D2T NN, and therefore may be similarly exemplarily illustrated by FIG. 4.

Figure 3A:
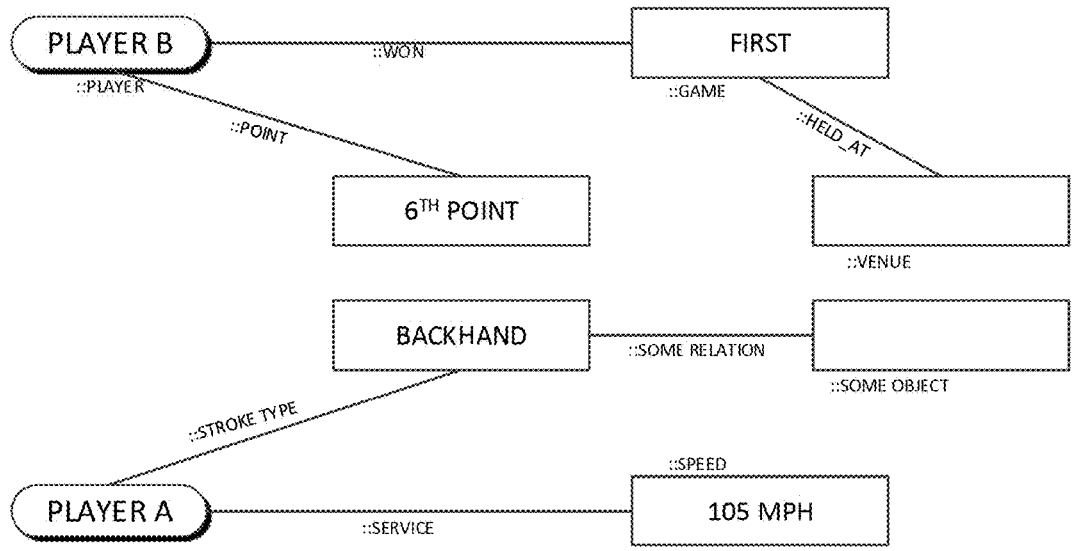
FIG. 3A depicts an exemplary tuple store, in accordance with the exemplary embodiments.
Figure 3B:
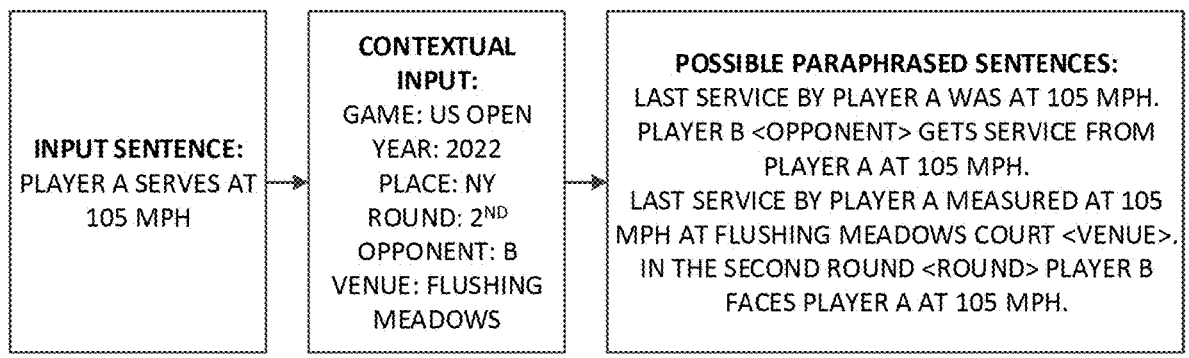
FIG. 3B depicts an exemplary base sentence, contextual input, and possible paraphrased sentences, in accordance with the exemplary embodiments.

For example, FIG. 3B depicts an input base sentence (e.g., a base sentence output by a D2T NN), contextual input, and possible paraphrased sentences as transformed by a T2T NN. In this example, the T2T NN may be trained on sentences when the player was in a particular context, for example playing poorly, and therefore the paraphrased sentences adding contextual input may connote poor play. Thus, in this example, the D2T NN is trained during a time period of excellent play while the T2T NN is trained during a time period of poor play, resulting in disjointed output sentences of the T2T NN where statistics of excellent play are paraphrased with context of poor play.

Prior to the conception of the present invention, applications in the current state of the art would merely apply the T2T NN generated from when the player was playing poorly to the base sentences output by the D2T NN from when the player was playing excellent, resulting in disjoint sentences where the context may connote poor play despite the data connoting excellent play. Natural language generation program 150 solves this problem by blending the weights of the two independent NNs over varying time frames at which the NNs are trained, as will be described in greater detail forthcoming.

Natural language generation program 150 may interleave the weights between the forecasted time sliced D2T NN and forecasted time sliced T2T NN (step 206). Because the D2T NN and the T2T NN have the same transformer topologies and architecture, natural language generation program 150 may readily interleave weights between the models to influence one with the other. Here, natural language generation program 150 may select a strategy of interleaving the weights such that the T2T NN and the D2T NN are correlated while retaining their respective, original intents. In a first strategy, the weights are interleaved together only on the encoding portion of the transformers, for example weights within the encoder stacks of the D2T with those of the T2T (and vice versa). Although some influence is transferred through interleaving, the process nonetheless ensures that an output of each model is consistent with the original intent. In a second strategy, weights of the encoding portions are interleaved similar to the first strategy, however weights of the multi-head attention layer within the decoder stack are additionally interleaved together. This latter strategy creates a greater amount of correlation while still maintaining the original intent each model. In embodiments, natural language generation program 150 may select a strategy with a best accuracy on a validation set as the winner.

Returning to the tennis example described above, natural language generation program 150 interleaves the weights of the D2T NN trained on data from the timeframe of excellent play with the weights of the T2T NN trained on data from the timeframe of poor play, and vice versa.

Natural language generation program 150 may smooth the interleaved weights (step 208). After having interleaved weights from the D2T NN into the T2T NN and vice versa, natural language generation program 150 may smooth the original weights and the interleaved weights. Natural language generation program 150 may smooth the weights by finding a midpoint between the original weights of an NN and the interleaved weights from the other NN. Natural language generation program 150 may smooth the weights via, for example, Gibs sampling between the interlaced layers to adjust the weights based on a conditional probability of the forward propagated weights. Natural language generation program 150 may interleave as a multivariate probability distribution and a function of multiple variables (i.e. 2 dimensional normal distribution). Here, the multivariate sampling is between two layers of the NN that have been interleaved together from D2T and T2T networks and the joint distribution is assumed to be like the original neural network (D2T or T2T) that has not been interleaved. Natural language generation program 150 alters the gradients based on the Gibs sampling until finding the midpoint between the interleaved weights and the weights of the original neural networks. This process helps to smooth the different learning representations from each task while maintaining correlation between the NN models. Using Gibs sampling, natural language generation program 150 performs multivariate sampling that joins $P(X, Y)$ in the process of smoothing, where we know the distributions for $P(X|Y)$ and $P(Y|X)$ but not $P(X,Y)$. From the Gibs algorithm, we can estimate the $P(X,Y)$ and ultimately determine the target variables for each layer, then use backwards propagation limited to each layer.

After having smoothed the interleaved weights, natural language generation program 150 now has a T2T NN correlated to the D2T NN and a D2T NN correlated to the T2T NN. At this stage, applying the correlated D2T NN may generate a base sentence more likely to include data that the T2T NN finds relevant, while applying the T2T NN may generate a paraphrase of the base sentence more likely to include data that the D2T finds relevant. In its current state, natural language generation program 150 may utilize the correlated D2T and T2T NNs to describe the data on which it is trained, but not yet can it be applied to past, present, or future events.

In the tennis example recited above, natural language generation program 150 finds midpoints between the weights of the original NN and those of the interleaved NN using Gibs sampling, resulting in a D2T NN trained on data from a timeframe of excellent play blended with the T2T NN trained on data from a timeframe of poor play. The result of the blending are NNs having outputs that are no longer disjointed based on the difference in timeframe at which the models were trained. For example, unlike noted above where the context added by a T2T NN may connote poor play despite the data provided by a D2T NN connoting excellent play, the blended NNs adapt to the changing performance between the timeframes and deliver dynamic outputs more accurately describing the content.

Natural language generation program 150 may forecast the D2T NN and the T2T NN over different forecasting durations (step 210). Having blended the D2T NN and T2T NN weights from the timeframes of data on which it is initially trained, natural language generation program 150 may now blend the weights for different time periods. This gives natural language generation program 150 foresight into the future learnings of the models based on different focused durations. Natural language generation program 150 may forecast the models over different timeframes by blending the weights as described above for the different indexed timeframes of the model training. The blended timeframes may include a past D2T NN with a past T2T NN, a past D2T NN with a current T2T NN, a past D2T NN with a future T2T NN, a current D2T NN with a past T2T NN, a current D2T NN with a current T2T NN, a current D2T NN with a future T2T NN, a future D2T NN with a past T2T NN, a future D2T NN with a current T2T NN, and a future D2T NN with a future T2T NN. By blending the models over various time periods, the timeframes at which the NNs were trained plays less of a factor in the generation of commentary. Moreover, the present invention may even predict future data such that models can be blended and ready in preparation of future events.

In the example recited above where the D2T NN trained on data from the timeframe of excellent play is blended with the T2T NN trained on data from the timeframe of poor play, natural language generation program 150 may further blend the models for alternative time slices.

Natural language generation program 150 may select a user mental model (step 212). The user mental model is broken into two phases. First, the time at which they are viewing the statistics of the game play, such as a live event or past event (time adjusted). This time is correlated to the D2T model. This D2T correlated model could be in the past, future, or present. Next, the time period of gross game play interest is related to a future, current, or past T2T model. For example, the user may be interested in a previous record holder, a current record holder, or a most-likely future record holder. Here, natural language generation program 150 may predict future values from which the D2T NN is trained such that outputs from a blended T2T NN reflect the predicted values. Natural language generation program 150 may predict the values using, for example, autoregression.

With reference again to the tennis example recited above, if the user is watching the match in real time and is interested in real-time statistics, natural language generation program 150 may select a D2T NN projected for real-time and a T2T NN for real-time.

Natural language generation program 150 may integrate the selected D2T NN and the selected T2T NN (step 214). Natural language generation program 150 may, if not already, interleave the weights of the D2T NN and the T2T NN selected for the mental model.

In the example above, natural language generation program 150 interleaves the projected, real-time D2T NN with the real-time T2T NN.

Natural language generation program 150 may generate sentences (step 216). In embodiments, the two models are selected and utilized to create narratives around the time that matches the user model. The output sentences match the user mental model in that they match the time at which they are viewing the statistics and the statistics of interest. The output thus results in a sentence that reflects the current perspective of the user, rather than a time at which the models were trained.

Returning to the tennis match example introduced above, natural language generation program 150 outputs commentary reflecting the current play of player A rather than data reflecting excellent play with commentary reflecting poor play.

Natural language generation program 150 may output the generated sentences (step 218). In embodiments, natural language generation program 150 may output the generated sentences for user consumption or input into other components of a pipeline. The output may be, for example, transmitted to a virtual or augmented reality headset for consumption by a user.

Human narrators are known to develop catch phrases. In embodiments, the corpus of generated sentences may be augmented by such personality catch phrases, selected from an appropriate personality bag of words, which are applied when the narration describes a new record, or similarly noteworthy event.

In some sporting events, such as golf, the entire tournament's standings can change from a single stroke's scoring update. For example, if the player makes birdy (or fails to make it) and in so doing pushes another player who may have already finished their round to just below the cut-line, thus creating a noteworthy event. Similarly in games like football or basketball that are played against the clock, such last-minute actions may have outsized impact to the outcome of the game, for example a hail-mary shot buzzer beater play. For such moments, the narration may reflect this added level of excitement, and even repeat the selected utterance to create additional excitement.

FIG. 3A depicts an exemplary tuple store, in accordance with the exemplary embodiments.

FIG. 3B depicts an exemplary base sentence, contextual input, and possible paraphrased sentences, in accordance with the exemplary embodiments.

FIG. 4 depicts an exemplary transformer, in accordance with the exemplary embodiments.

Figure 5:
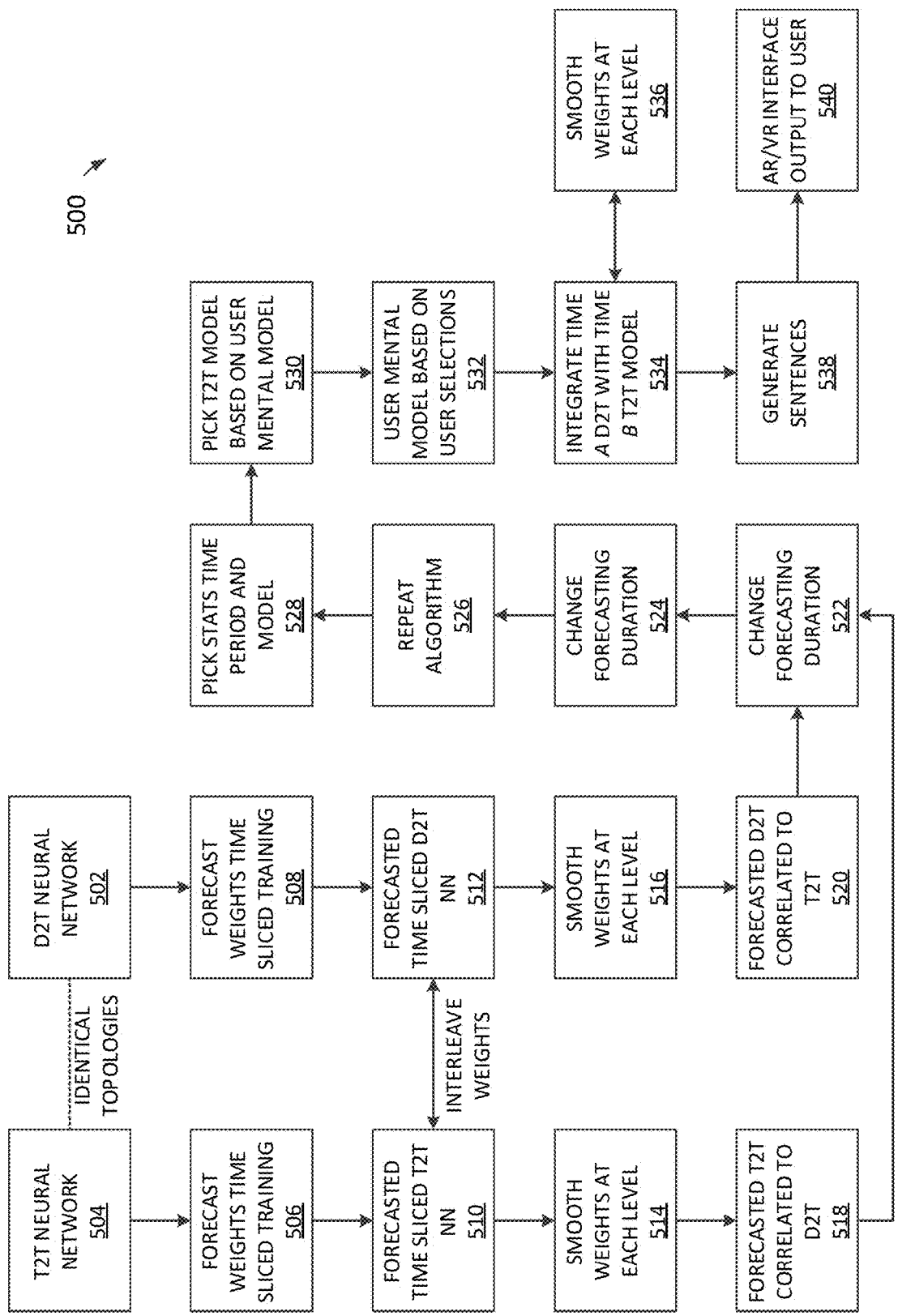
FIG. 5 depicts an exemplary functional flow diagram illustrating the operations of natural language generation program 150, in accordance with the exemplary embodiments.

FIG. 5 depicts an exemplary functional flow diagram illustrating the operations of natural language generation program 150, in accordance with the exemplary embodiments.

What is claimed is:

1. A method for diverse natural language generation, the method comprising:
   training a data-to-text neural network (D2T NN) using first training data;
   training a text-to-text neural network (T2T NN) using second training data, wherein the D2T NN and the T2T NN have identical transformer architectures, and wherein the training of the D2T NN and the T2T NN are indexed by time;
   interleaving weights between the D2T NN and the T2T NN by transferring weights between encoding portions of the D2T NN and the T2T NN, wherein the interleaving minimizes an effect of the first training data and the second training data being collected at different times; and
   generating a sentence based on the interleaved D2T NN and T2T NN.

2. The method of claim 1, wherein the D2T NN converts one or more statistics into one or more tuples and generates one or more base sentences based on the one or more tuples.

3. The method of claim 2, wherein the T2T NN paraphrases the one or more base sentences while adding context.

4. The method of claim 1, wherein interleaving the weights between the D2T NN and the T2T NN further comprises:
   transferring weights between decoding portions of the D2T NN and the T2T NN.

5. The method of claim 1, further comprising:
   smoothing the interleaved weights and original weights to a midpoint.

6. The method of claim 5, wherein the smoothing is performed via Gibs sampling.

7. A computer program product for diverse natural language generation, the computer program product comprising:
   one or more non-transitory computer-readable storage media and program instructions stored on the one or more non-transitory computer-readable storage media capable of performing a method, the method comprising:
   training a data-to-text neural network (D2T NN) using first training data;
   training a text-to-text neural network (T2T NN) using second training data, wherein the D2T NN and the T2T NN have identical transformer architectures, and wherein the training of the D2T NN and the T2T NN are indexed by time;
   interleaving weights between the D2T NN and the T2T NN by transferring weights between encoding portions of the D2T NN and the T2T NN, wherein the interleaving minimizes an effect of the first training data and the second training data being collected at different times; and
   generating a sentence based on the interleaved D2T NN and T2T NN.

8. The computer program product of claim 7, wherein the D2T NN converts one or more statistics into one or more tuples and generates one or more base sentences based on the one or more tuples.

9. The computer program product of claim 8, wherein the T2T NN paraphrases the one or more base sentences while adding context.

10. The computer program product of claim 7, wherein interleaving the weights between the D2T NN and the T2T NN further comprises:
    transferring weights between a decoding portions of the D2T NN and the T2T NN.

11. The computer program product of claim 7, further comprising:
    smoothing the interleaved weights and original weights to a midpoint.

12. The computer program product of claim 11, wherein the smoothing is performed via Gibs sampling.

13. A computer system for diverse natural language generation, the system comprising:
    one or more computer processors, one or more computer-readable storage media, and program instructions stored on the one or more of the computer-readable storage media for execution by at least one of the one or more processors capable of performing a method, the method comprising:
    training a data-to-text neural network (D2T NN) using first training data;
    training a text-to-text neural network (T2T NN) using second training data, wherein the D2T NN and the T2T NN have identical transformer architectures, and wherein the training of the D2T NN and the T2T NN are indexed by time;
    interleaving weights between the D2T NN and the T2T NN by transferring weights between encoding portions of the D2T NN and the T2T NN, wherein the interleaving minimizes an effect of the first training data and the second training data being collected at different times; and
    generating a sentence based on the interleaved D2T NN and T2T NN.

14. The computer system of claim 13, wherein the D2T NN converts one or more statistics into one or more tuples and generates one or more base sentences based on the one or more tuples.

15. The computer system of claim 14, wherein the T2T NN paraphrases the one or more base sentences while adding context.

16. The computer system of claim 13, wherein interleaving the weights between the D2T NN and the T2T NN further comprises:
    transferring weights between decoding portions of the D2T NN and the T2T NN.

17. The computer system of claim 13, further comprising:
    smoothing the interleaved weights and original weights to a midpoint.

* * * * *